United States Patent
Furuya (10) Patent No.: US 10,057,671 B2
(45) Date of Patent: *Aug. 21, 2018

(54) MICROPHONE

(71) Applicant: Kabushiki Kaisha Audio-Technica, Tokyo (JP)

(72) Inventor: Hiroaki Furuya, Tokyo (JP)

(73) Assignee: KABUSHIKI KAISHA AUDIO-TECHNICA, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 15/336,902

(22) Filed: Oct. 28, 2016

(65) Prior Publication Data

US 2017/0134839 A1    May 11, 2017

(30) Foreign Application Priority Data

Nov. 5, 2015    (JP) .................................. 2015-217278

(51) Int. Cl.
*H04R 1/04* (2006.01)
*H04R 1/08* (2006.01)
(Continued)

(52) U.S. Cl.
CPC ................. *H04R 1/04* (2013.01); *F21V 7/00* (2013.01); *F21V 33/0052* (2013.01);
(Continued)

(58) Field of Classification Search
CPC .......... H04R 1/04; H04R 1/083; H04R 1/028; H04R 1/08; H04R 1/086; H04R 2201/028; H04R 2201/029; H04R 2201/02; F21V 33/0052; F21V 33/0056; F21V 19/003; F21V 19/0035; F21V 19/0045; F21V 19/0055; G02B 6/0096; G02B 6/0005;
(Continued)

(56) References Cited

U.S. PATENT DOCUMENTS 5,289,355 A * 2/1994 Cimock .................. A63J 17/00
    362/109
5,994,842 A * 11/1999 Wong .................. H05B 37/0236
    315/129
(Continued)

FOREIGN PATENT DOCUMENTS

CN    201629826    * 12/2009    ............... H04R 1/08
JP    H05 49088 A    2/1993
(Continued)

*Primary Examiner* — Davetta W Goins
*Assistant Examiner* — Oyesola C Ojo
(74) *Attorney, Agent, or Firm* — W&C IP (57) ABSTRACT

To enable light to be easily visually recognized, the light indicating an operation state. A tubular microphone case, a light source that is accommodated in a position close to a first end of the microphone case and emits light in a direction of the first end, a light source mounting board on which the light source is placed, a light guide member including a protrusion and having an optically transmissive property, and a holding member that maintains a position of the light source and a position of the light guide member, and is fixed to the microphone case together with the light source mounting board are included, and the holding member includes a hole capable of accepting the protrusion.

6 Claims, 14 Drawing Sheets

(51) Int. Cl.
*F21V 7/00* (2006.01)
*F21V 33/00* (2006.01)
*F21V 8/00* (2006.01)
*F21Y 115/10* (2016.01)

(52) U.S. Cl.
CPC ........... *G02B 6/0096* (2013.01); *H04R 1/083* (2013.01); *F21Y 2115/10* (2016.08)

(58) Field of Classification Search
CPC .... G02B 6/0006; G02B 6/0008; G02B 6/001; G02B 6/0033; G02B 6/0066; G02B 6/0076; F21Y 2115/10
USPC ........................................................ 381/363
See application file for complete search history.

(56) References Cited

U.S. PATENT DOCUMENTS

| | | | | |
|---|---|---|---|---|
| 6,690,804 B2* | 2/2004 | Everett | ............... | F21V 33/0056 362/86 |
| 7,306,347 B2* | 12/2007 | Selover | ............... | F21V 33/0052 362/806 |
| 8,989,421 B2* | 3/2015 | Akino | .................... | H04R 1/086 381/355 |
| 9,332,333 B2* | 5/2016 | Akino | .................... | H04R 1/028 381/355 |
| 2002/0001190 A1* | 1/2002 | Everett | ............... | F21V 33/0056 362/86 |
| 2009/0034778 A1* | 2/2009 | Chi | ........................ | H04R 1/028 381/394 |
| 2012/0002975 A1* | 1/2012 | Nakazawa | ......... | H04B 10/1141 398/132 |
| 2015/0092975 A1* | 4/2015 | Akino | ..................... | H04R 1/08 381/355 |
| 2015/0304754 A1* | 10/2015 | Akino | .................... | H04R 1/086 381/359 |

FOREIGN PATENT DOCUMENTS

| | | |
|---|---|---|
| JP | H09 93679 A | 4/1997 |
| JP | 2015-70465 | 4/2015 |

* cited by examiner

MICROPHONE

BACKGROUND

Technical Field

The present invention relates to a microphone.

Related Art

There is a demand by users of gooseneck microphones used in conferences, speeches, and the like to visually identify a microphone in operation to identify a speaker. To respond to such a demand, microphones that enable an operation state to be visually recognized with a light emitting portion including a light source such as a light emitting diode (LED) are known.

To allow the users to visually recognize the operation state in a wide range, a light emitting portion having a wide visual recognition angle is required. Therefore, a light emitting portion that emits light in a ring shape in the entire periphery of a side surface of a tubular microphone case is desirable. To cause the light emitting portion to emit light in the entire periphery of a side surface of the microphone case, an increase in the number of the light sources can be considered. However, the increase in the number of the light sources of the light emitting portion incurs an increase in cost and power consumption. Therefore, it is not desirable.

Note that a technique related to a microphone including a light emitting portion for enabling an operation state to be visually recognized is disclosed (for example, JP 2015-70465 A).

SUMMARY

Figure 14:
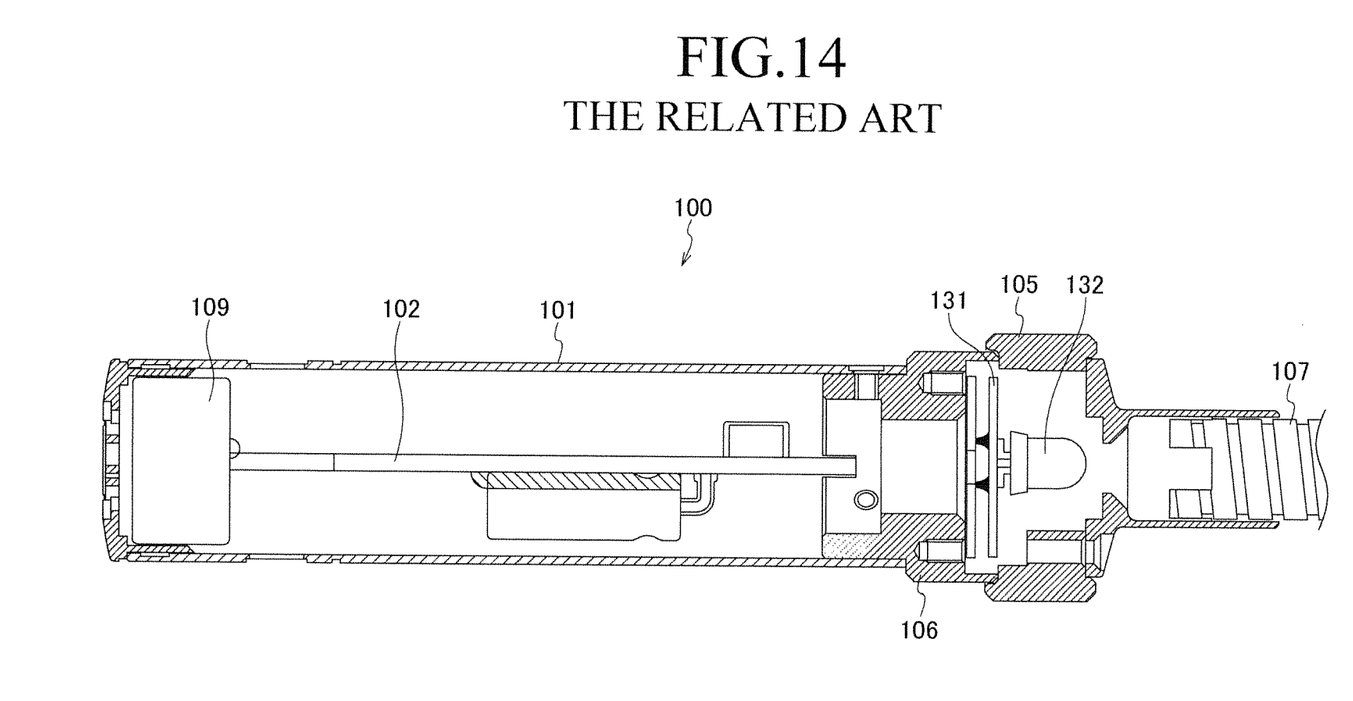
FIG. 14 is a side sectional view illustrating a conventional microphone.

As illustrated in FIG. 14, in a microphone 100 of the related art, for example, a light source 132 is mounted on a light source mounting board 131 such that light mainly proceeds in the direction of a flexible pipe 107. In the microphone 100, the amount of light reaching a lens 105 from the light source 132 is small, and thus light use efficiency is low. Therefore, in the microphone 100, the light through the lens 105 cannot be uniformly viewed from a side direction of a microphone case 101, and visibility is poor. Furthermore, in the microphone 100, the light use efficiency is low, and thus power consumption of the light source becomes large. Therefore, in the microphone 100, a power source for the light source is necessary, in addition to a drive power source used in a microphone unit 109 and a drive circuit 102.

An objective of the present invention is to provide a microphone that enables light to be easily visually recognized, the light indicating an operation state.

The present invention includes: a tubular microphone case; a light source that is accommodated in a position close to a first end of the microphone case and emits light in a direction of the first end; a light source mounting board on which the light source is placed; a light guide member including a protrusion and having an optically transmissive property; and a holding member that maintains a position of the light source and a position of the light guide member, and is fixed to the microphone case together with the light source mounting board, wherein the holding member includes a hole capable of accepting the protrusion.

According to an embodiment of the present invention, a microphone that enables light to be easily visually recognized, the light indicating an operation state, can be obtained.

DETAILED DESCRIPTION

Hereinafter, an embodiment of a microphone according to the present invention will be described with reference to the drawings.

Configuration of Microphone

Figure 1:
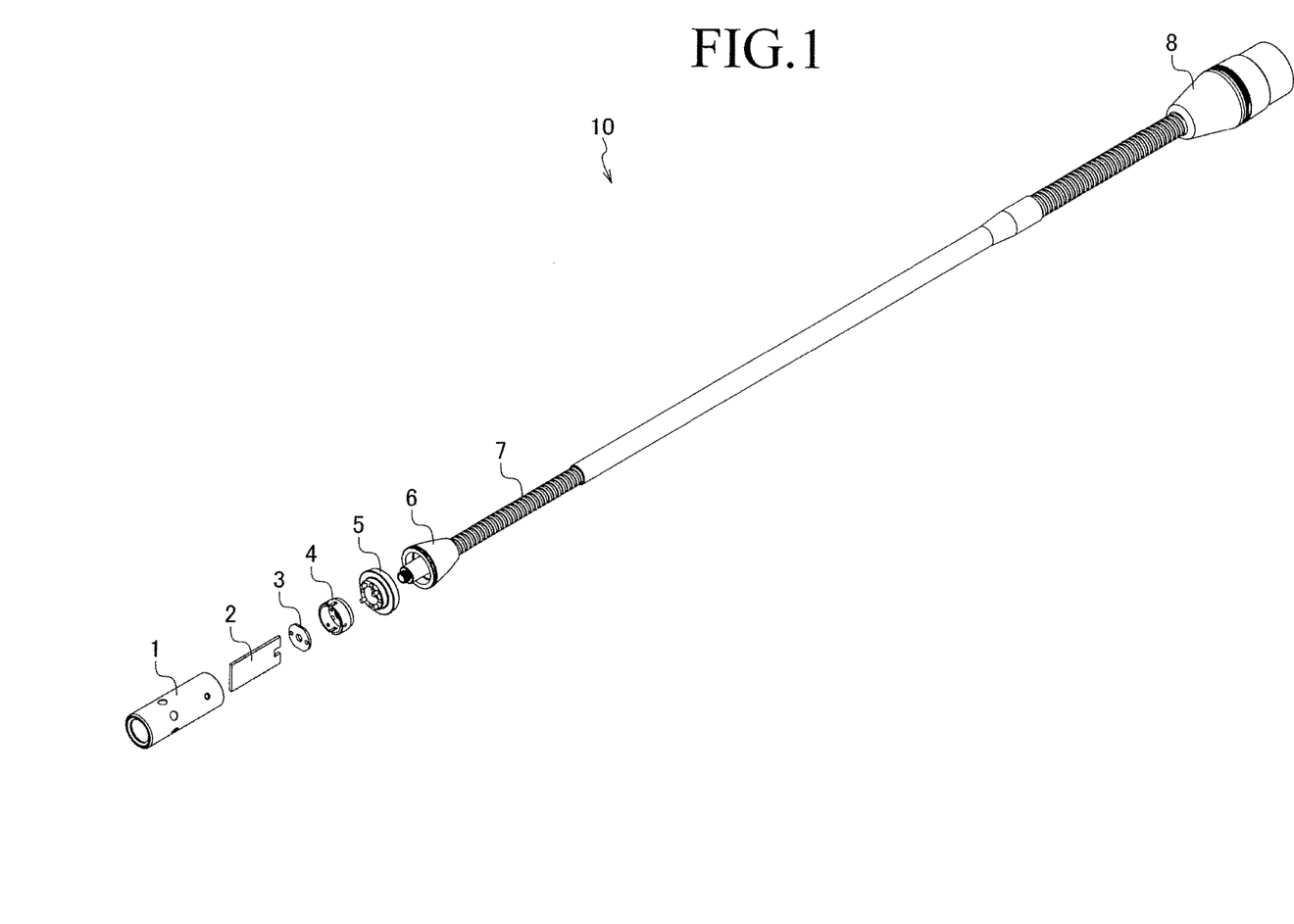
FIG. 1 is an exploded perspective view illustrating an embodiment of a microphone according to the present invention.

As illustrated in FIG. 1, a microphone 10 according to an embodiment of the present invention is a gooseneck microphone used in conferences, speeches, and the like. The microphone 10 includes a microphone case 1, a circuit board 2, a light source mounting board 3, a holding member 4, a light guide member 5, a coupler 6, a flexible pipe 7, and a base 8.

Figure 2:
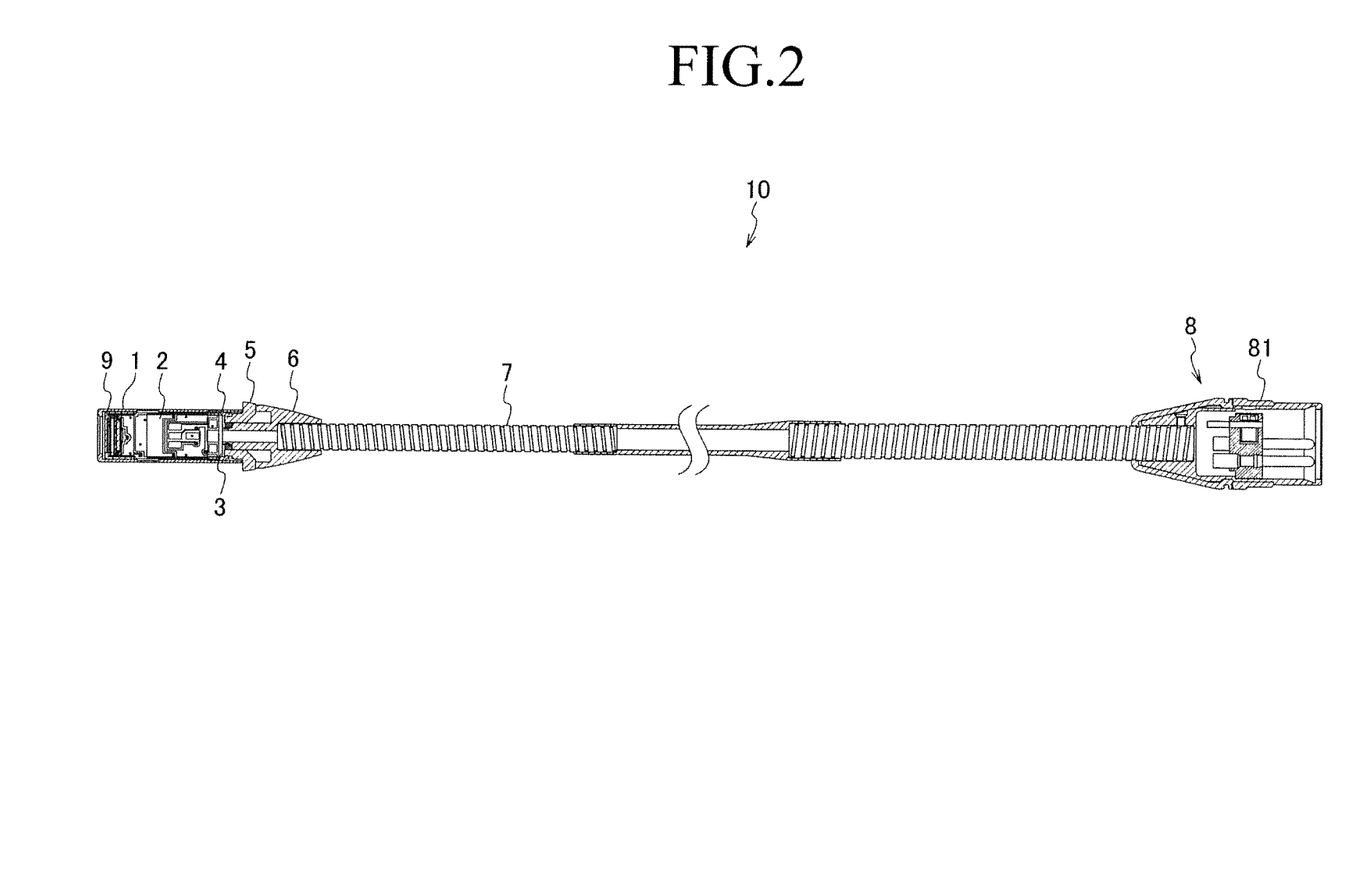
FIG. 2 is a side sectional view of the microphone.

As illustrated in FIG. 2, for example, the microphone case 1 is a tubular housing made of metal, more specifically, a cylindrical housing and having a hollow portion. In the description below, a front end (in the left direction on the sheet surface of FIG. 2) of the microphone case 1 is referred to as a first end, and a rear open end (in the right direction on the sheet surface of FIG. 2) of the microphone case 1 is referred to as a second end. The microphone case 1 accommodates a microphone unit 9 that converts an audio signal into an electrical signal, the circuit board 2, the light source mounting board 3, the holding member 4, and the light guide member 5. Furthermore, the microphone case 1 includes a front opening portion 11 provided in front of the microphone unit 9, and a rear opening portion 12 provided in rear of the microphone unit 9.

Figure 3:
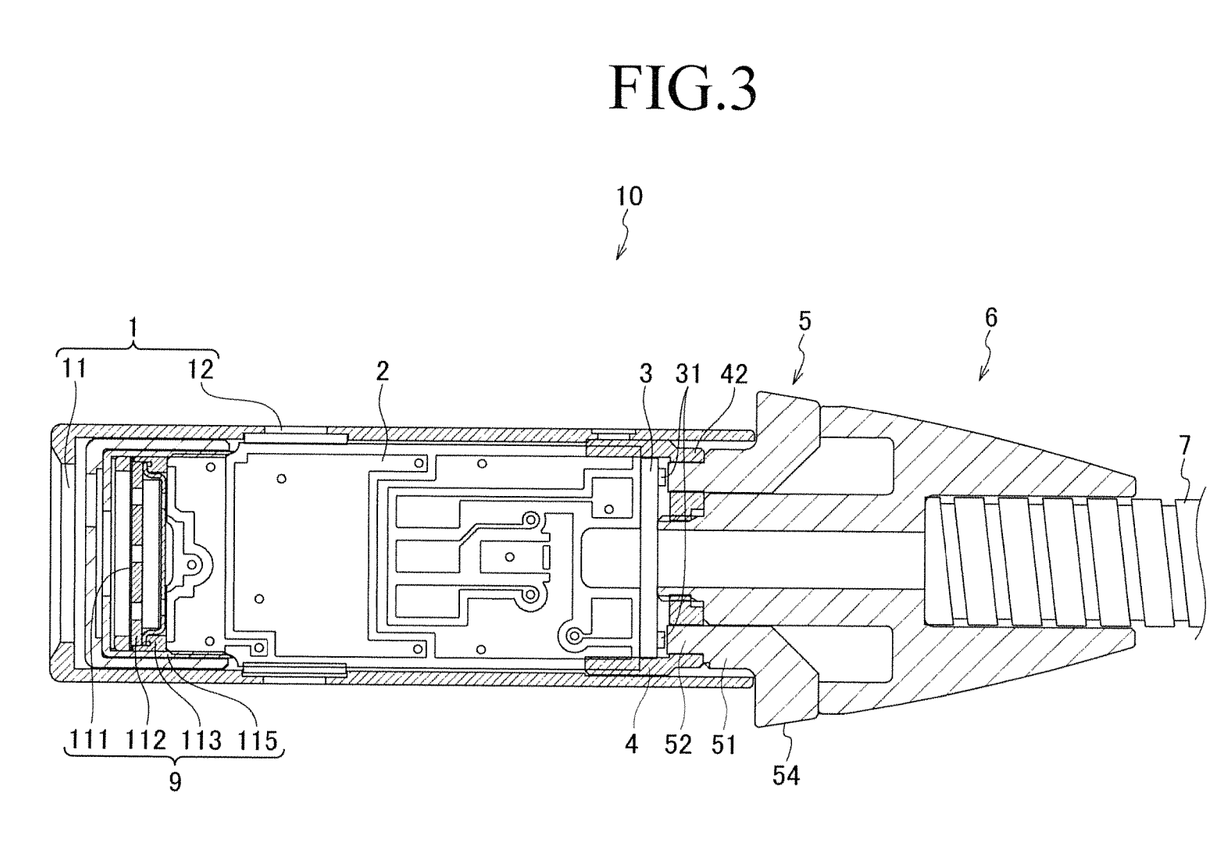
FIG. 3 is an enlarged side sectional view of a microphone case and its periphery of the microphone.

As illustrated in FIG. 3, the microphone unit 9 is provided in a position close to the front in the microphone case 1, that is, near the front opening portion 11. The microphone unit 9 includes a diaphragm 111 that vibrates by sound waves entering from the outside through the front opening portion 11 and the rear opening portion 12, and a fixed electrode 112 that configures a capacitor together with the diaphragm 111. Furthermore, the microphone unit 9 includes an insulating holder 113 that holds the diaphragm 111 and the fixed electrode 112, and a unit case 115 that holds the diaphragm 111, the fixed electrode 112, and the like.

In the microphone case 1, the circuit board 2 is provided closer to the rear than the microphone unit 9 is. The circuit board 2 is, for example, a typical flat plate-like printed board. Electronic components that configure various circuits used for an operation of the microphone 10, such as a field effect transistor (FET) as an impedance transducer, an amplifier circuit, and a low cut circuit are mounted on the circuit board 2.

Configuration of Light Source Mounting Board

The light source mounting board 3 is accommodated inside the microphone case 1. A light source 31 mounted on the light source mounting board 3 is accommodated to face a second end direction in the inside of the microphone case 1. The light source mounting board 3 is a typical flat plate-like printed board, for example, and its planar shape is a circular plate shape corresponding to an internal shape of the microphone case 1. As the light source 31, for example, a light emitting diode (LED) that is small and has small power consumption is desirable. For example, the power consumption of the light source 31 is just about power consumption by which the light source 31 can be driven by a phantom power supply of the microphone 10.

Configuration of Light Guide Member (1)

The light guide member 5 is a member that takes in the light from the light source 31 and guides the light in an outward direction of the microphone case 1. The light guide member 5 is formed of an optically transmissive material such as poly methyl methacrylate (PMMA) resin that is milky white as a whole. Note that the light guide member 5 may be formed of a material having a color other than milky white or a transparent material as long as the material is an optically transmissive material.

Figure 4:
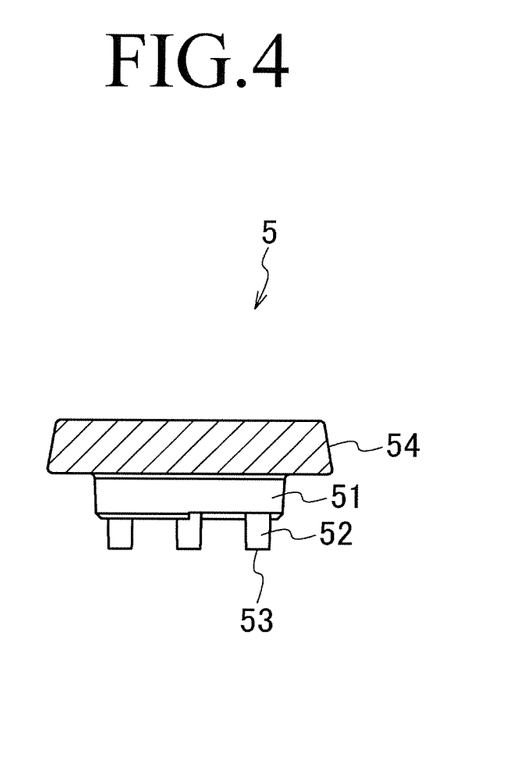
FIG. 4 is a side view of a light guide member of the microphone.
Figure 5:
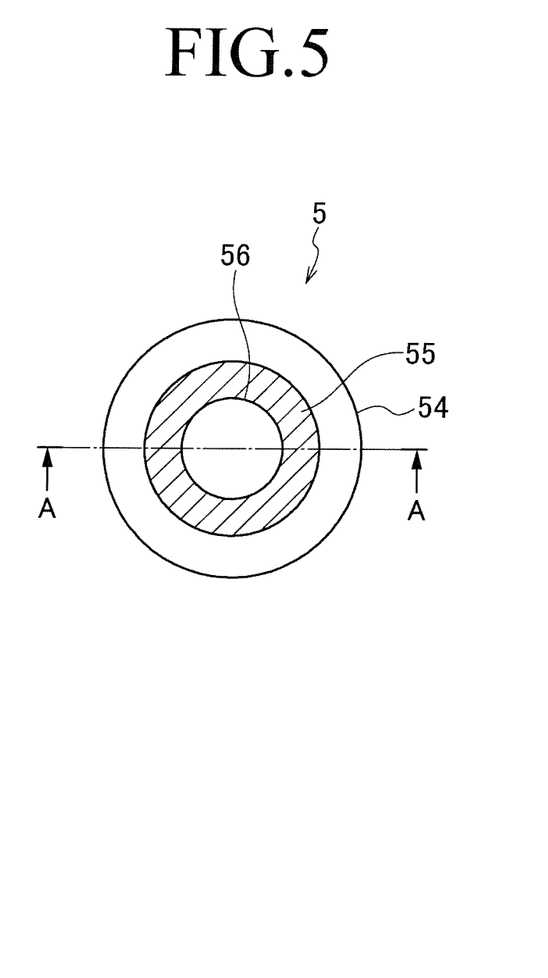
FIG. 5 is a front view of the light guide member.
Figure 6:
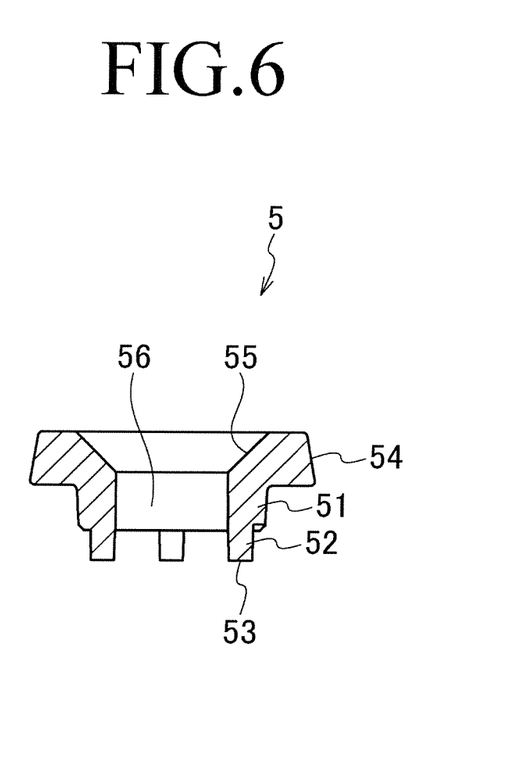
FIG. 6 is an A-A sectional view of the light guide member.

As illustrated in FIG. 4, the light guide member 5 has a substantially cylindrical external shape corresponding to the shape of the microphone case 1. The light guide member 5 includes a light guide portion main body 51, columnar portions 52, entering surfaces 53, and an emitting surface 54. As illustrated in FIGS. 5 and 6, the light guide member 5 includes a reflecting surface 55 and a hole 56.

The light guide portion main body 51 defines the entire shape of the light guide member 5. The light guide portion main body 51 guides the light from the light source 31, which has entered through the entering surface 53 and has passed through the columnar portion 52, into the reflecting surface 55. The columnar portion 52 has a protruding shape protruding from the light guide portion main body 51. The columnar portion 52 functions as a light guide path like an optical fiber, which corresponds to the size of a light emitting surface of the light source 31 and guides the light from the light source 31 to the light guide portion main body 51. The entering surface 53 is provided on the columnar portion 52. The entering surface 53 is a surface parallel or nearly parallel to the light emitting surface of the light source 31, and allows the light from the light source 31 to efficiently enter the reflecting surface 55.

The reflecting surface 55 is positioned at an opposite side of the entering surface 53, that is, positioned close to the rear, in a state where the light guide member 5 is attached to the microphone case 1. The reflecting surface 55 is a totally reflecting surface integrally molded with the light guide portion main body 51, for example. The reflecting surface 55 has a substantially conical shape continuously expanding from the hole 56 in the center of the light guide member 5 toward a rear end. In other words, the reflecting surface 55 is substantially trapezoidal in section view of the side surface. Because the reflecting surface 55 has the substantially conical shape, the light is reflected at the entire periphery of the emitting surface 54. Therefore, in the microphone 10, the emitting surface 54 seems to emit light in a ring shape. To diffuse the reflected light, emboss processing, blast processing, or the like may be applied to the reflecting surface 55. The reflecting surface 55 reflects the light having entered the light guide portion main body 51, and changes an advancing direction of the light into a side surface direction of the microphone case 1. In other words, the reflecting surface 55 guides the entering light to be emitted outward in a radial direction from the center of the light guide member 5.

The hole 56 is closely adjacent to a cylindrical portion 62 of the coupler 6 in a state where the light guide member 5 is attached to the microphone case 1.

The emitting surface 54 is provided to face a side surface of the microphone case 1, in the light guide member 5, and emits the light from the light source 31 and reflected by the reflecting surface 55. Emboss processing, blast processing, or the like may be applied to the emitting surface 54 to diffuse the emitted light and enlarge a visual recognition angle.

Configuration of Holding Member

Figure 7:
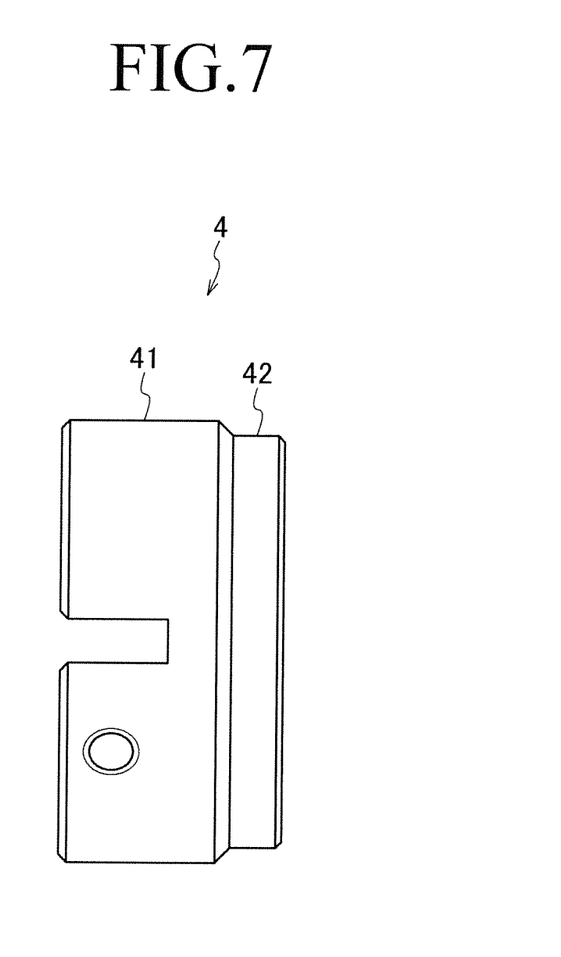
FIG. 7 is a side view of a holding portion of the microphone.

As illustrated in FIG. 7, the holding member 4 includes a light source holding portion 41 that holds the position of the light emitting surface of the light source 31, and a light guide member holding portion 42 that holds the position of the entering surface 53 of the light guide member 5. The holding member 4 is fixed to the inside of the microphone case 1 together with the light source mounting board 3 held by the light source holding portion 41. Therefore, an outer diameter of the holding member 4 is smaller than an inner diameter of the microphone case 1.

Figure 8:
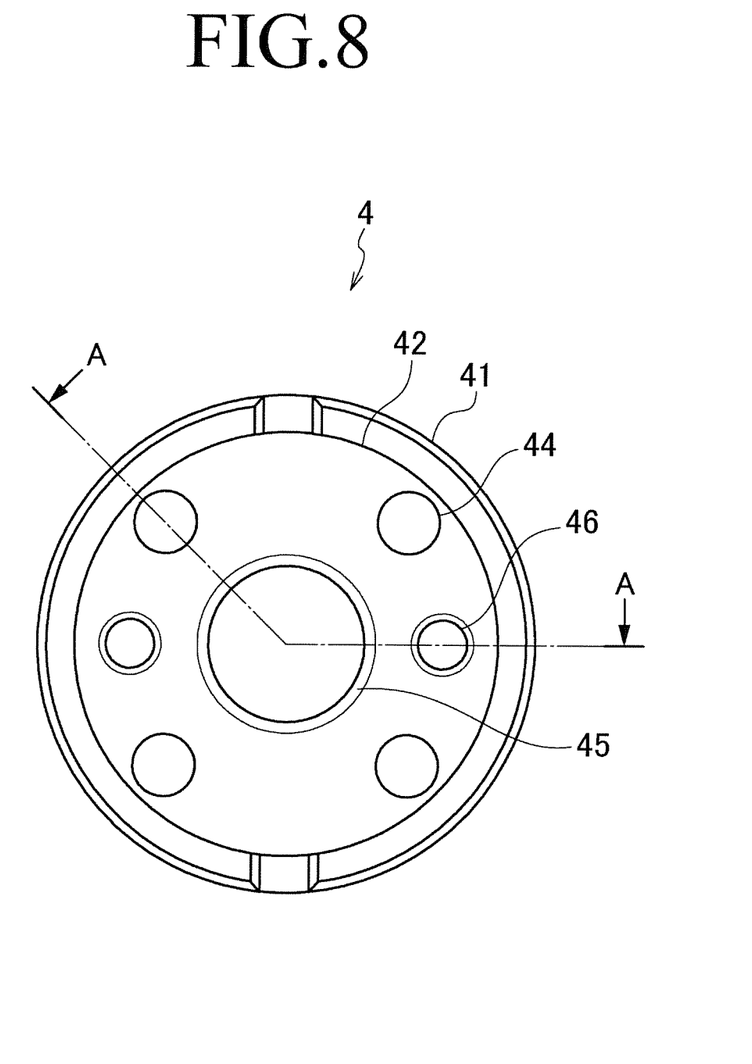
FIG. 8 is a front view of the holding portion.
Figure 9:
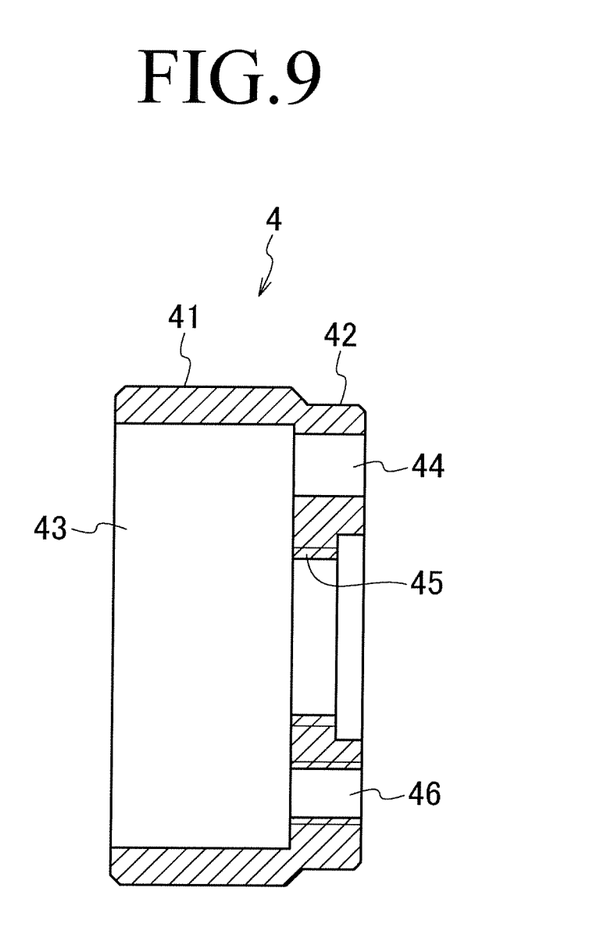
FIG. 9 is an A-A sectional view of the holding portion.

As illustrated in FIGS. 8 and 9, a hole-shaped light source mounting board accommodating portion 43 that can accommodate the light source mounting board 3 is formed inside the light source holding portion 41. Furthermore, a hole-shaped columnar portion accepting portion 44 that can accept the columnar portion 52 of the light guide member 5 is formed inside the light guide member holding portion 42. With the light source mounting board accommodating portion 43 and the columnar portion accepting portion 44, the light source 31 of the light source mounting board 3 and the entering surface 53 of the light guide member 5 are arranged in a closely adjacent manner. That is, with the holding member 4, the light from the light source 31 efficiently enters the entering surface 53, and thus the light use efficiency is improved in the microphone 10.

Furthermore, the columnar portion 52 is fit into the columnar portion accepting portion 44. When the columnar portion 52 and the columnar portion accepting portion 44 are fit into each other, positions of the light source 31 and the entering surface 53 can be easily fixed to each other. Furthermore, when the columnar portion 52 and the columnar portion accepting portion 44 are fit into each other, assembly of a light emitting portion becomes easy.

The number of the columnar portions 52 may be one or more than one. When there is a plurality of the columnar portions 52, the positions of the light source 31 and the entering surface 53 are further fixed to each other. Furthermore, when the columnar portions 52 respectively include the entering surfaces 53, the light from the light source 31 efficiently enters the reflecting surface 55.

Furthermore, the holding member 4 includes a female screw portion 45 for fixing the coupler 6, in a position closer to the center than the light guide member holding portion 42 is, inside the light guide member holding portion 42. A fixing structure between the female screw portion 45 and the coupler 6 will be described below. Furthermore, the holding member 4 includes a screw hole 46 that allows a screw for fixing the light source mounting board 3 to the holding member 4 to pass through, inside the light guide member holding portion 42.

Configuration of Coupler

As illustrated in FIGS. 1 and 2, the coupler 6 is connected to the microphone case 1 and the flexible pipe 7. The coupler 6 is attached to a second end side of the microphone case 1 and covers the open end on the second end side, and the light guide member 5 and the like in a periphery of the open end. The coupler 6 is fixed to the holding member 4 and attached to the microphone case 1.

Figure 10:
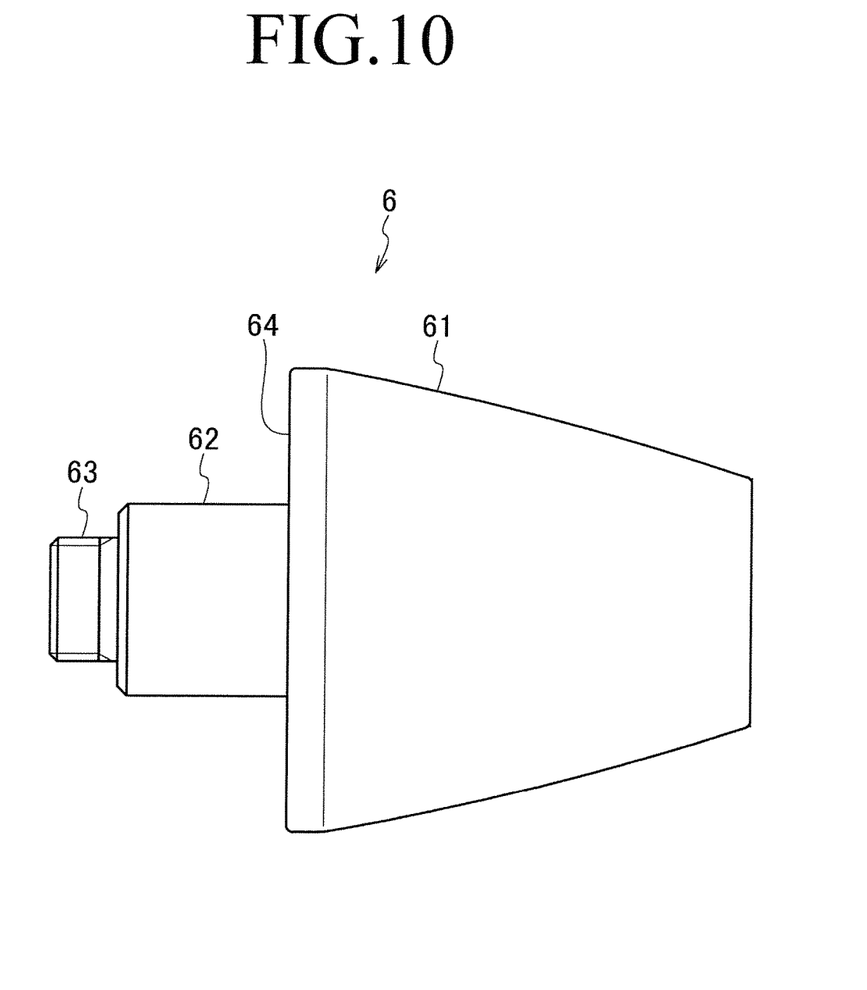
FIG. 10 is a side view of a coupler of the microphone.

As illustrated in FIG. 10, the coupler 6 includes a coupler main body 61 having a substantially conical shape, a cylindrical portion 62 having a substantially cylindrical shape, a male screw portion 63 provided at a tip end of the cylindrical portion 62, and a wall portion 64 that is a boundary portion between the coupler main body 61 and the cylindrical portion 62. The male screw portion 63 is screwed into the female screw portion 45 of the holding member 4 described above. Therefore, when the male screw portion 63 is screwed into the female screw portion 45, the coupler 6 and the holding member 4 are fastened to each other.

Figure 11:
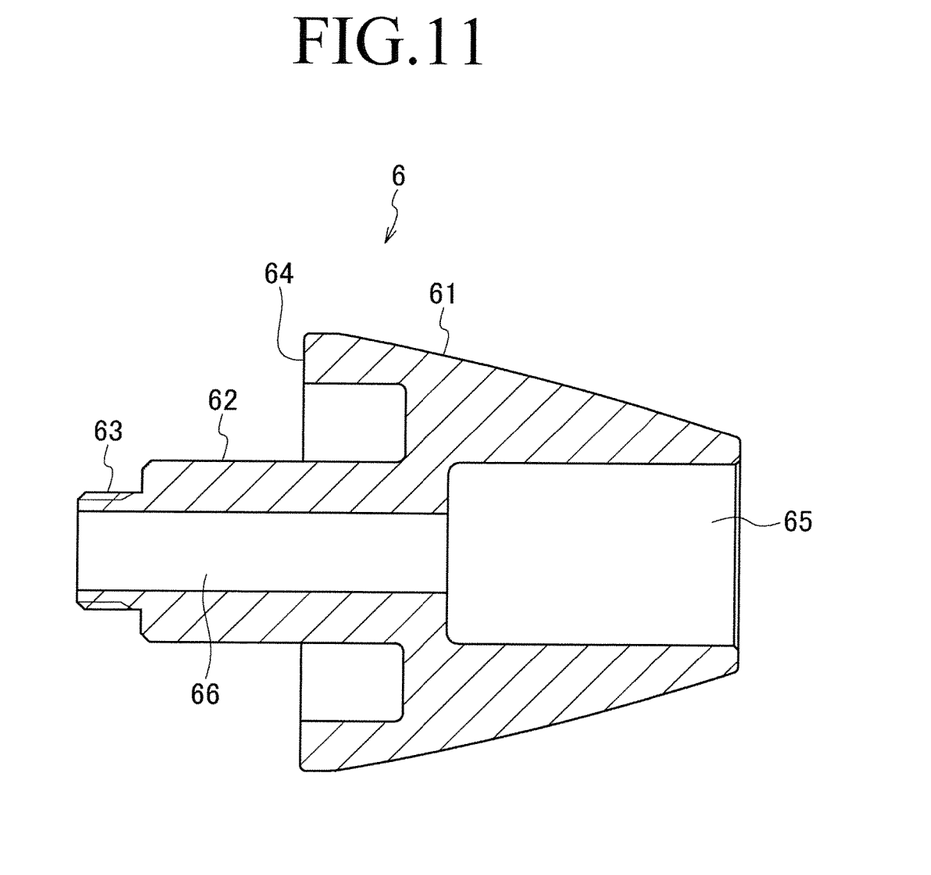
FIG. 11 is a side sectional view of the coupler.

As illustrated in FIG. 11, the coupler 6 includes a flexible pipe joint hole 65 for being joined with the flexible pipe 7. Furthermore, the coupler 6 includes a through hole 66 that penetrates from the male screw portion 63 to an end portion at the opposite side. Various cables to the microphone unit 9 are arranged in the through hole 66.

Configurations of Flexible Pipe and Base

As illustrated in FIG. 2, the microphone 10 includes the flexible pipe 7 assembled in the coupler 6 and supporting the microphone case 1. The flexible pipe 7 has a hollow cylindrical shape. The flexible pipe 7 includes a first wire material that is a steel wire and the like with a circular section shape formed into a coil spring, and a second wire material that is a brass wire and the like with a triangular section shape, formed into a coil spring and inserted into a gap between the first wire materials. The flexible pipe 7 is freely bendable while holding the tubular basic shape by friction caused between the first wire material and the second wire material, which are both plastically deformable.

The microphone 10 includes the base 8 that is joined with the flexible pipe 7 and supports the microphone case 1. As illustrated in FIG. 2, a connector 81 for electrically connecting the microphone 10 to other devices is provided inside the base 8.

Configuration of Light Emitting Portion

A configuration and a function of the light emitting portion of the microphone 10 will be described, the light emitting portion being formed of the light source mounting board 3, the light source 31, the holding member 4, the light guide member 5, and the coupler 6 described above.

The holding member 4 fixes the light emitting surface of the light source 31 mounted on the light source mounting board 3 and the entering surface 53 of the light guide member 5 in a closely adjacent state. The holding member 4 includes the columnar portion accepting portion 44 that can accept the columnar portion 52 of the light guide member 5. With such a configuration of the holding member 4, the light from the light source 31 efficiently enters the light guide member 5. That is, because the microphone 10 includes the holding member 4, the light use efficiency is improved. Therefore, according to the microphone of the present embodiment, the light guide member 5 can light up brightly even with the configuration using the light source 31 having small power consumption.

As described above, the light guide member 5 includes the entering surface 53 that efficiently takes in the light from the light source 31, the reflecting surface 55 that totally reflects the light from the light source 31, and the emitting surface 54 that efficiently emits the light. Therefore, in the microphone 10, the light use efficiency is high and the light guide member 5 can light up brightly, even if the light source 31 having small power consumption is used. Furthermore, processing such as emboss processing to enhance light diffusibility is applied to the reflecting surface 55 and the emitting surface 54, and therefore, the light from the emitting surface 54 is diffused at a wider angle.

As described above, according to the microphone 10 of the present embodiment, an excellent effect of easily visually recognizing the operation state is exerted.

Furthermore, since the holding member 4 includes the female screw portion 45, the female screw portion 45 can be fastened to the male screw portion 63 of the coupler 6, and thus fixation between the microphone case 1 and the coupler 6 becomes easy.

The shape of the cylindrical portion 62 of the coupler 6 corresponds to the hole 56 inside the reflecting surface 55 of the light guide member 5. Therefore, the position of the light guide member 5 can be held by the cylindrical portion 62.

Configuration of Light Guide Member (2)

Figure 12:
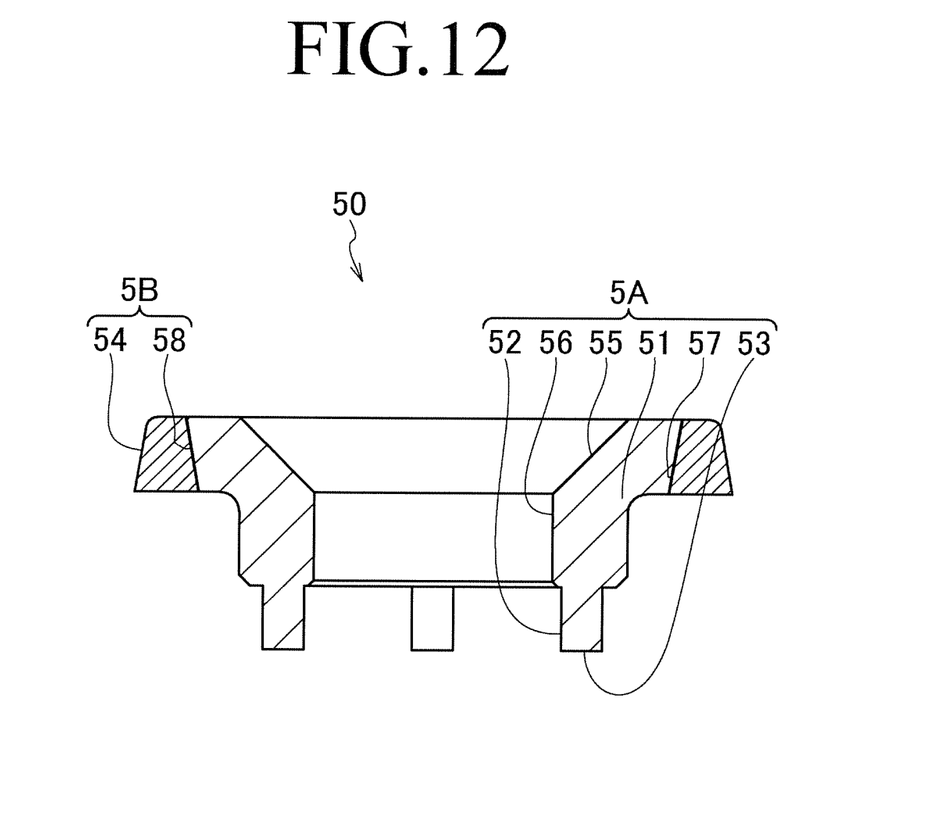
FIG. 12 is a side sectional view illustrating a light guide member of another embodiment of the microphone according to the present invention.
Figure 13:
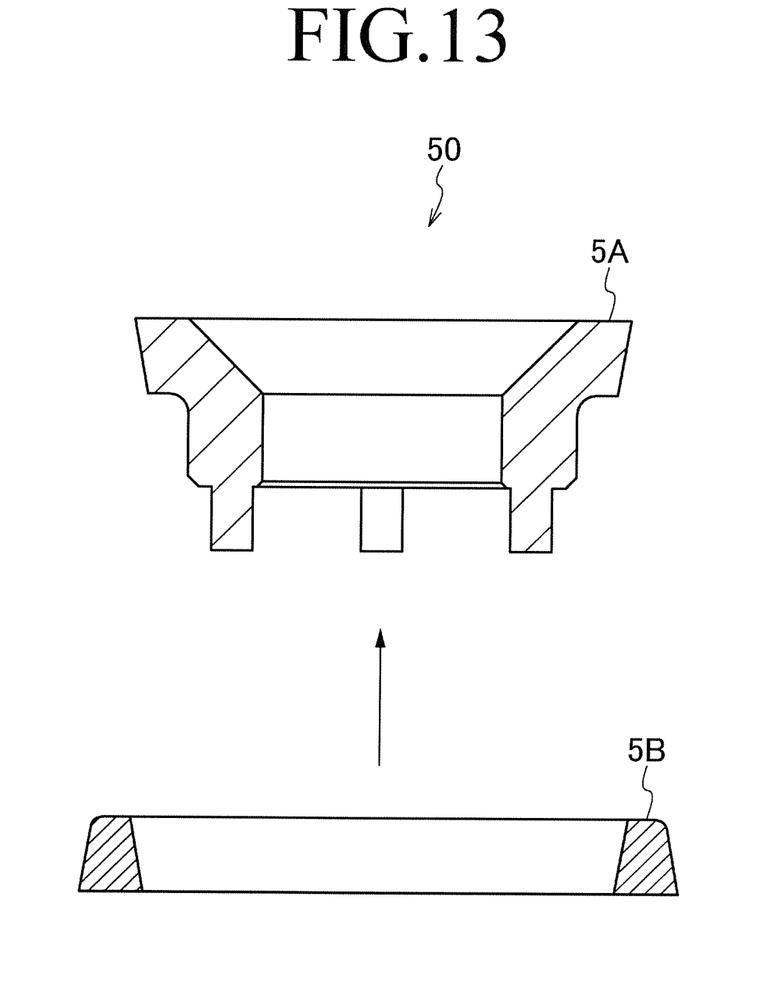
FIG. 13 is an exploded sectional view of the light guide member.

As illustrated in FIGS. 12 and 13, in the microphone 10, a light guide member 50 may be divided into two members including a first light guide member 5A and a second light guide member 5B. The first light guide member 5A includes a light guide portion main body 51, a columnar portion 52, an entering surface 53, a reflecting surface 55, a hole 56, and an intermediate emitting surface 57. The second light guide member 5B includes an emitting surface 54 and an intermediate entering surface 58. In the light guide member 50, the light having entered the entering surface 53 of the first light guide member 5A goes through the columnar portion 52 and the light guide portion main body 51, is reflected at the reflecting surface 55, and is emitted through the intermediate emitting surface 57. The light emitted through the intermediate emitting surface 57 goes through the intermediate entering surface 58 of the second light guide member 5B, and is emitted through the emitting surface 54 to the outside.

What is claimed is:

1. A microphone comprising:
   a tubular microphone case;
   a light source that is accommodated in a position close to a first end of the microphone case and emits light in a direction of the first end;
   a light source mounting board on which the light source is placed;
   a light guide member including a protrusion and having an optically transmissive property; and
   a holding member that maintains a position of the light source and a position of the light guide member, and is fixed to the microphone case together with the light source mounting board, wherein
   the holding member includes a hole capable of accepting the protrusion,
   wherein the hole is disposed corresponding to the position of the light source, and
   wherein the protrusion passes through the hole and extends toward a light emitting surface of the light source.

2. The microphone according to claim 1, further comprising:

a coupler fixed to the holding member and attached to the microphone case, wherein
the holding member includes a female screw portion in a joint portion with the coupler, and
the coupler includes a male screw portion in a joint portion with the holding member.

3. The microphone according to claim 2, wherein
the light guide member includes:
an entering surface provided on the protrusion, and to which the light from the light source enters;
a reflecting surface that reflects the light in a side surface direction of the microphone case; and
an emitting surface that emits the light from the reflecting surface.

4. The microphone according to claim 3, wherein
the light guide member has a hollow tubular shape.

5. The microphone according to claim 3, wherein
the reflecting surface is a trapezoid in section view of a side surface.

6. The microphone according to claim 2, wherein
the light guide member is fixed to the coupler and the holding member.

* * * * *